Nov. 13, 1934.     A. WRIGHT     1,980,244
WASTE DISPOSAL
Filed July 17, 1931     2 Sheets-Sheet 1
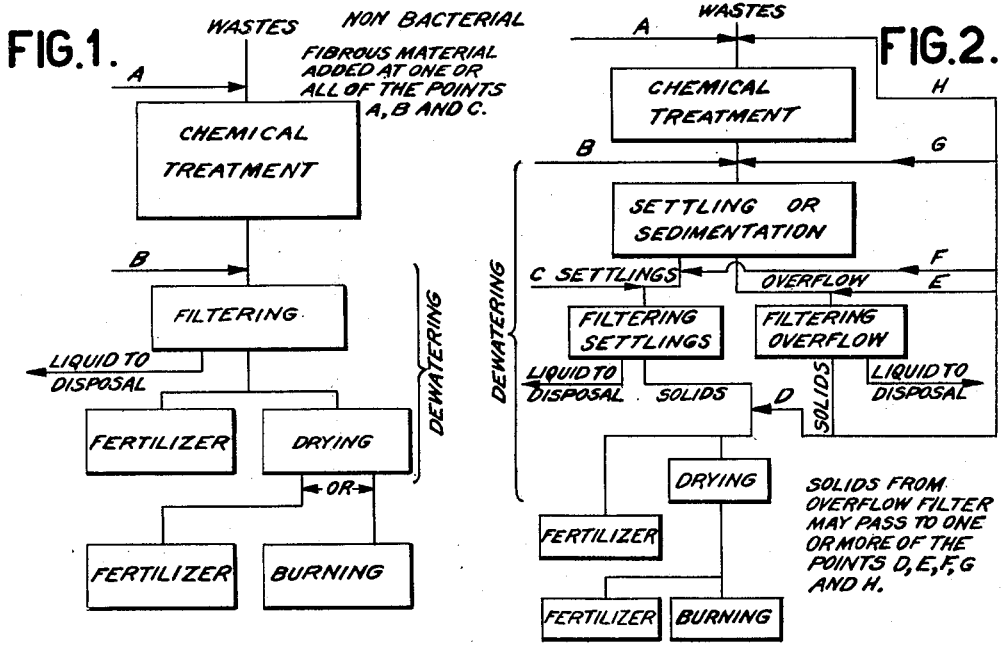
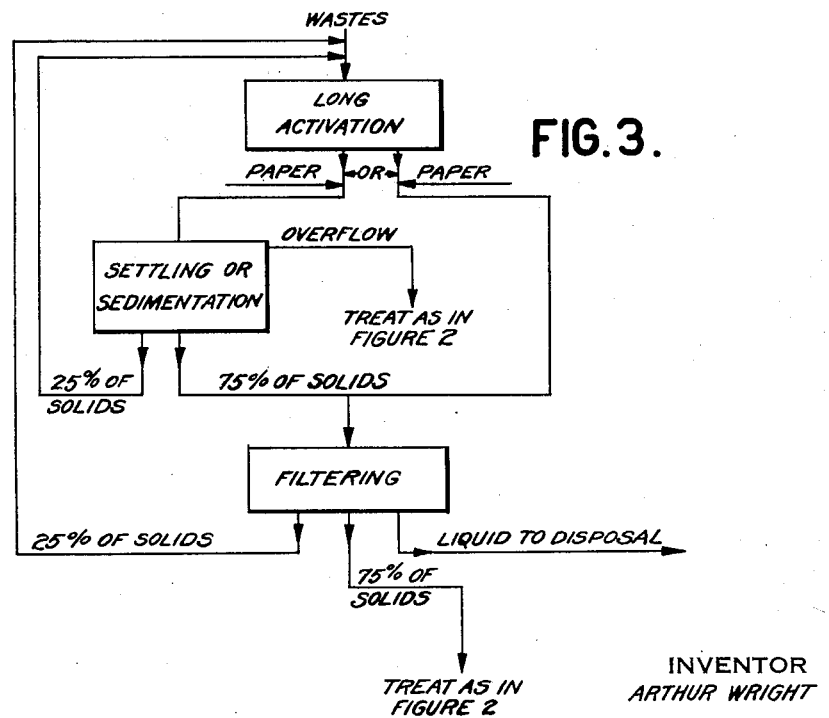
INVENTOR
ARTHUR WRIGHT
BY HIS ATTORNEY
Bohleber + Ledbetter Nov. 13, 1934.       A. WRIGHT        1,980,244
WASTE DISPOSAL
Filed July 17, 1931       2 Sheets-Sheet 2

INVENTOR
ARTHUR WRIGHT
BY HIS ATTORNEY
Bohleber + Ledbetter

Patented Nov. 13, 1934

1,980,244

UNITED STATES PATENT OFFICE 1,980,244

WASTE DISPOSAL

Arthur Wright, Upper Montclair, N. J.

Application July 17, 1931, Serial No. 551,354

5 Claims. (Cl. 210—2)

The invention relates to a process for the treatment and disposal of municipal and industrial wastes, such as sewage, dye house wastes, wool scouring wastes, etc., so that a product is produced which is easily handled, innocuous and readily disposed of. The treatment also proceeds rapidly to conclusion which is an added advantage.

The principal object of the invention is to treat the municipal and industrial wastes by mixing a fibrous material or particularly paper pulp therewith and subsequently dewatering the mixture.

Another object of the invention is to mix a fibrous material, such as paper pulp, with the wastes and dewatering the mixture by filtering. The fibrous material mixed in the wastes so reinforces the deposit upon the filter that the filtered mixture is readily discharged from the filtering medium in sheet-like form.

A further object is to mix the wastes with a fibrous material, then dewater the mixture by filtering and lastly, burning the filtered mixture.

Another object is to mix a combustible material with the wastes and then dewater, dry and burn the wastes so that combustion is aided by the added combustible material intimately mixed therewith.

Another object is to mix a fibrous combustible material such as paper pulp with the wastes and subsequently dewater the mixture which dewatering includes filtering, and burning the dry mixture.

Other objects of the invention will be more apparent from the following description, taken in connection with the accompanying drawings showing the preferred embodiment of the invention, in which:

Figures 1 and 2 show the steps by which the wastes, and particularly municipal waste or sewage, are treated and disposed of, the treatment being the non-bacterial or chemical process.

Figures 3, 4 and 5 show the steps in the treatment of municipal and industrial wastes when treated with the bacterial process.

Figure 4:
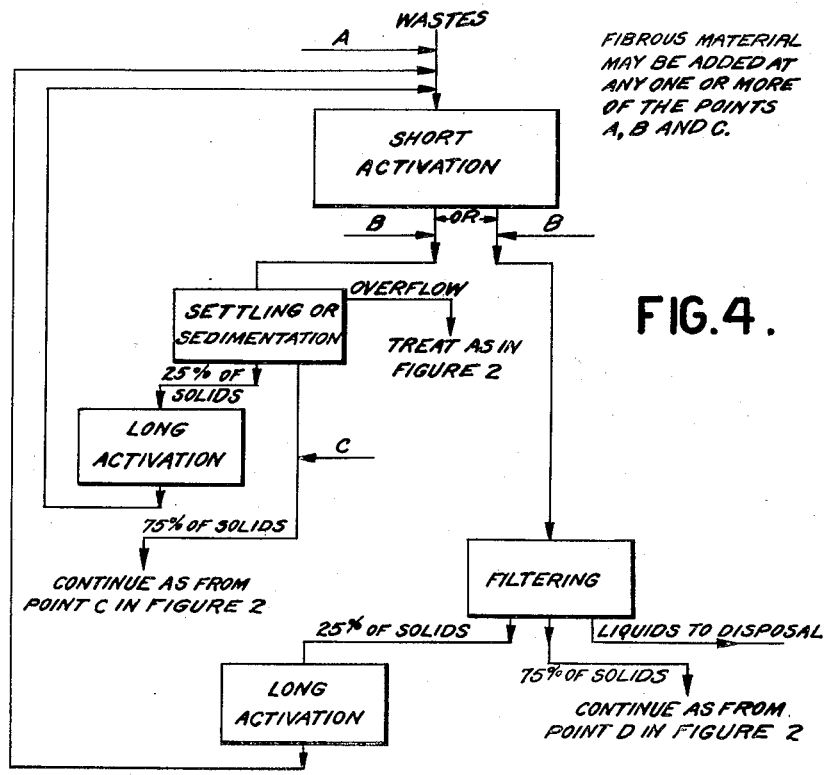

Industrial wastes, such as dye house and wool scouring wastes, and municipal waste which is largely sewage with other waste mixed therein, are being treated and disposed of today in other ways than by freely pumping or dumping the wastes into rivers, lakes or other bodies of water with the consequent pollution of these waters.

These wastes contain very large quantities of liquid or water so that the principal steps in treating them is to separate the solids and the liquid and dispose of the solids in any suitable manner. Obviously, any treatment of the wastes should have as its objects the sanitary and noxious disposal of the solids and the production of a clear liquid. The method or process of treating municipal wastes or sewage will be discussed and described herein and industrial wastes two of which are referred to above as illustrative of such wastes, may be subjected to the same treatment.

There are two methods or processes, now in general use, of treating and disposing of municipal waste which will be termed sewage hereinafter. These two methods are known as the chemically treated or non-bacterial method and the bacterial method of sewage treatment such as the activated sludge method. In the former or non-bacterial method, the chemical treatment of the sewage flocculates the solids in the sewage by the action of chemicals. In the bacterial process, the sewage is treated to cultivate or promote the development and growth of the bacteria which consume much of the organic matter therein.

In the treatment of sewage by the non-bacterial method, the sewage is first treated with a chemical, such as lime, ferrous sulphate, alum or some other chemical or chemicals known to the art, which flocculates the solids and clarifies the liquid. The solids are then separated from the liquid which will be termed dewatering. The dewatering may be performed by settling, filtering, heating, drying or by any other method for accomplishing this result. Preferably, a combination of two or more of these methods is utilized in order to obtain the solids in the desired dewatered condition. In practicing the method of the invention, a fibrous material such as paper pulp, is added to the sewage at any point in the non-bacterial treatment of the sewage. The material may be mixed with the raw sewage before chemical treatment or it may be added as the sewage is being treated with the chemicals, or it may be added after flocculation of the solids in the sewage has been completed.

Upon completion of the flocculation of the solids in the chemically treated sewage, the mixture of solids and paper pulp is dewatered. One method of dewatering the mixture of solids and pulp or of separating the mixture and the liquid, is by filtration which is preferably accomplished by means of drum type vacuum filters, although any type of filter is suitable. The mixture is picked up upon the drum of the filter and the liquid passes through the filtering medium under the action of the vacuum.

The filtered mixture of sewage solids and paper pulp may be manufactured into fertilizer or it may be further dewatered by drying through evaporation such as in ovens or upon heated cylinders before being converted into this product. Much of the filtered mixture undoubtedly must be disposed of in some other manner than in the manufacture of fertilizer. Such filtered mixture as is not converted into this product may be dried and when dry the mixture is readily burned in a furnace, such as a cement kiln. The combustion may require the use of additional fuel in order to completely burn the wastes. The use of an incinerable fibrous material, such as paper pulp, has therefore this further advantage of supplying additional combustible material and in addition the paper pulp is intimately mixed with the sewage solids thereby more readily promoting their combustion.

The mixture of fibrous material or paper pulp with the sewage has numerous advantages which will be enumerated. The pulp agglomerates or assists in agglomerating the fine solids in the liquid sewage and thereby speeds up the dewatering of the mixture. Then again the pulp builds up a fibrous deposit upon the filter which materially aids filtration. The most important function of the paper pulp however, is to reinforce, bind or enmesh the sewage solids and build up a self-sustaining sheet like composite deposit of sewage solids interlaced with fibres upon the filter medium of the vacuum filter which such composite cake is readily discharged from the filter.

The use of paper pulp has also an economical advantage. Waste paper pulp is relatively inexpensive and, in fact, in large cities the waste paper accumulated is so large that its disposal constitutes a real municipal problem. Such waste paper when beaten up or disintegrated into a pulp is very well suited as a fibrous material to be added to the sewage in the process or method of sewage disposal of the invention.

The deposit of sewage solids, unmixed with fibrous material as in the invention, often forms a slimy and slippery deposit of a gelatinous character and very difficult to remove. Where a string discharge is used upon the filter, the strings invariably pull through the filtered deposit and the deposit remains upon the medium. With paper pulp or a fibrous material mixed therewith a more reinforced deposit is obtained, in other words, the fibres act as a binder for the filter cake, which cake is readily removed from the filtering medium irrespective of the kind of discharging means used and the deposit lifts off of the drum in a continuous sheet which is very readily handled for conversion into fertilizer or for further dewatering such as by drying, as described hereinbefore. The deposit formed upon the filtering medium is also removed easily by the string type of discharge. The admixture of a fibrous material to the wastes aids materially the complete discharge of the deposit from the filter.

The mixture of sewage and fibrous material may be dewatered by the use of a prior or additional dewatering step to the filtering step or the filtering and drying steps of the dewatering treatment described above. Such initial dewatering may be accomplished by settling the flocculated sewage in basins or tanks. The settled solids form a sludge or thickened mass at the bottom of the settling tank or basin from which the settlings are pumped and subjected to further dewatering treatment, such as the vacuum filters described above. The filters in dewatering the sludge have a smaller amount of liquid removal to accomplish and hence the filters rapidly build up a deposit on the filter from the sludge. The filtered mixture may be converted into fertilizer without further treatment or it may be dried before the conversion or the dried mixture may be burned as will be understood.

The method of treating sewage by the addition of a fibrous material, such as paper pulp, is also applicable in the treatment of sewage by the bacterial process such as the activated sludge process. In this process which illustrates one method of the bacterial method of wastes and particularly sewage wastes, the raw sewage is activated such as by aeration in open tanks in a manner known to the art. As a result of the activation the solids are flocculent in form, after which the solids and liquids are separated and the solids are dewatered.

The usual method of flocculating the solids of the sewage by cultivation of bacteria and bacterial activity, extends the cultivation to the completion of the bacterial process. This takes usually anywhere from six to eighteen hours. Wood fiber such as paper pulp and other cellulose fibers mixed with the sewage before bacterial cultivation of the raw sewage, would be largely consumed by the bacteria and the fibrous structure or character of the pulp would be substantially destroyed. It is for this reason that the pulp would not ordinarily be added to the sewage until after completion of the bacterial cultivation in the process where cultivation of the bacterial activity is continued to completion.

Flocculation of the sewage solids by the bacterial process can be accomplished without carrying the process to completion. Here the raw sewage is treated with some activated sludge and the mixture subjected to a shortened period of aeration. The settlings from the clarification of this liquor is divided, part going to the dewatering station and part to be returned to treat more raw sewage. The latter portion may be subjected to prolonged aeration so as to develop maximum flocculating effect of this activated sludge. By this method the bacterial cultivation proceeds sufficiently far to obtain flocculation of the sewage solids and any cellulosic material mixed therewith is unaffected by the bacterial growth or at least is not affected sufficiently to cause any noticeable effect upon the process. This process is illustrated in Figure 4.

Any method of dewatering the mixture of fibrous material or paper pulp and sewage or wastes in the bacterial process is contemplated by the invention. The dewatering may be accomplished by filtration upon vacuum filters which method is particularly suited to dewater the mixture and a considerable amount of dewatering is accomplished thereon. The filtered mixture may then be converted into fertilizer or it may be conditionally dried and then converted into fertilizer, or it may be dried as described with respect to the treatment of the filtered mixture produced by the chemical process and then burned.

It is clear that the method of treating raw sewage by the addition of fibrous material thereto is capable of considerable variation or changes in the various steps in the process, particularly with respect to the point where the paper pulp is added to the sewage or wastes. To illustrate briefly, it has been described that in the chemical or non-bacterial method of treating sewage, the paper pulp may be added at any stage in the process prior to filtration. In other words, the paper may be added to the raw sewage before, after or during its treatment with lime, or it may be added after flocculation of the sewage solids has been completed. If the sewage is dewatered by settling as an initial dewatering step the pulp may be added to the settlings or underflow after their removal from the settling tanks or basins. The addition of the paper at any point does not affect any subsequent and additional dewatering by filtration, excepting in the bacterial process which exception has been discussed.

It has also been pointed out that several variations or changes may be made in the dewatering of the sewage in which paper pulp is added therewith. In either the bacterial or non-bacterial processes described herein, three separate dewatering steps were described, namely, sedimentation or settling, which separates considerable liquid or water from the sewage and leaves a thickened sludge, then filtration of the sludge which removes much of the remaining moisture, and lastly conditionally drying the filtered sewage which dries the filtered mixture of sewage and pulp sufficiently to enable the dried product to be burned or otherwise treated. These three steps are three separate methods of dewatering and it has been pointed out that the sedimentation or settling process may be eliminated and the mixture of flocculated sewage and paper pulp may be fed directly to the filters. Similarly, the filtered mixture as it comes off of the filter need not necessarily be dried and burned, but this product may be converted or used as fertilizer.

The use of paper pulp is applicable also to clarify and remove the very finely divided and difficultly handled solids remaining in the overflow from the settling or sedimentation of the sewage where this initial dewatering step is resorted to. The overflow from the settling or sedimentation tanks customarily has been treated by passing it through a sand bed or sand bed type of filter which removes these very finely divided solids of sewage carried by the overflow. By mixing paper pulp with the overflow liquid, the fibers of the paper pulp reinforce and entrain the very finely divided particles of sewage carried thereby and also provide additional bulk so that a layer of deposit is formed upon the filter thick enough to be easily removed therefrom. The filtered mixture of pulp and sewage solids obtained from the overflow may be dried and burned as described herein with respect to the treatment of the flocculated sewage.

The overflow from the settling tanks necessarily contains a small quantity of sewage solids with large quantities of water, as is readily understandable, since the settling process has as its object the removal of the greater portion of the solids from the sewage and wastes. As a consequence, the product obtained from filtering or otherwise dewatering the mixture of paper pulp and sewage from the overflow is largely paper with a small percentage of sewage solids carried therewith. The product therefore may be used over again with additional overflow liquid to remove the sewage solids from this additional overflow liquid until eventually the paper pulp carries sufficient sewage solids so that its efficiency may be reduced or rendered unsuited for further admixture with overflow liquid. Such reusing of the paper pulp may continue for numerous times, depending upon the quantity of solids in the overflow liquid. If the quantity of solids is small, obviously the number of times in which the filter product may be reused is increased.

In order to make the treatment of the overflow liquids continuous, approximately 80 to 90% of the product from the filter may be fed back to the overflow liquid. The remaining 10 to 20% may be carried to a drier where the filtered mixture is conditionally dried and then subsequently burned, as described with respect to the product obtained from the previously described treatment of sewage, or it may be used as paper pulp in any of the processes for the treatment of sewage described herein and may be added at any point in these processes just as though it were a fresh unused charge of pulp. Obviously, the proportions mentioned herein are subject to variation, depending upon the quantity of solids in the overflow.

The amount of paper pulp which is used with the raw sewage may vary, but seldom will the paper pulp exceed 50% dry weight of the solids in the sewage. It is immaterial whether the quantity of pulp is determined from the raw sewage or from the sludge of either the bacterial or non-bacterial processes. A smaller quantity may be used and, in fact, in a test run, the process of treating sewage in accordance with the invention was successfully conducted in which the quantity of paper pulp added was one-third of the total solids in the sewage. Incidentally, the activated sludge process of sewage treatment was used in this test. Where there is a large amount of water present as would be the case where the sewage is filtered directly after flocculation of the solids therein, a larger percentage of paper pulp is used to give increased or added bulk to the solids contained within the liquid. In the treatment of the overflow from the settling tanks a very large quantity of pulp is used relatively to the sewage solids in the liquid and in fact, the quantity of pulp may well run as high as several times the quantity of sewage solids carried in the overflow. The usual quantity of paper pulp added in the two latter sewage or waste conditions is 0.3% of the weight of the liquor.

There are several advantages obtained from the mixing of paper pulp with the sewage, one of which is that the paper pulp assists in agglomerating or entraining the sewage solids and thereby increases the rate of filtering of the sewage and the clarifying thereof. A more important function of the mixture of fibrous material or paper pulp with the sewage is that a firmer and a reinforced product is obtained upon the filter. In both the activated and the chemically treated processes for the treatment of raw sewage, the filtered product is often very slimy and slippery and particularly so in the activated sludge process. This slimy and slippery product is very difficult to remove from the filtering medium upon the filter and tends to adhere to and smear the filter cloth. This condition is improved by the addition of large quantities of chemicals which is expensive.

With a mixture of sewage and paper pulp, the product obtained upon the filtering medium is fibrous in character and reinforces the sewage solids. This fibrous product is easily removed from the filtering medium of the filter with any type of discharge device and does not require the addition of chemicals although a limited amount may be beneficial. With the string type of discharge upon the filter, the strings pull through the unreinforced filtered product on the filtering medium and leave it thereupon. With the paper pulp mixed therewith a product is obtained upon the filter which is fibrous in character and reinforces the sewage solids mixed therewith thereby obtaining a product which the strings will not pull through so that the filtered mixture of sewage and paper pulp is removed as a continuous sheet from the filter upon the string discharge. It is clear, therefore, that the mixture of sewage and paper pulp introduces a new combination with the string discharge which enables this type of discharge with its inherent advantages to be utilized in the discharge of sewage from a drum type filter.

Figure 5:
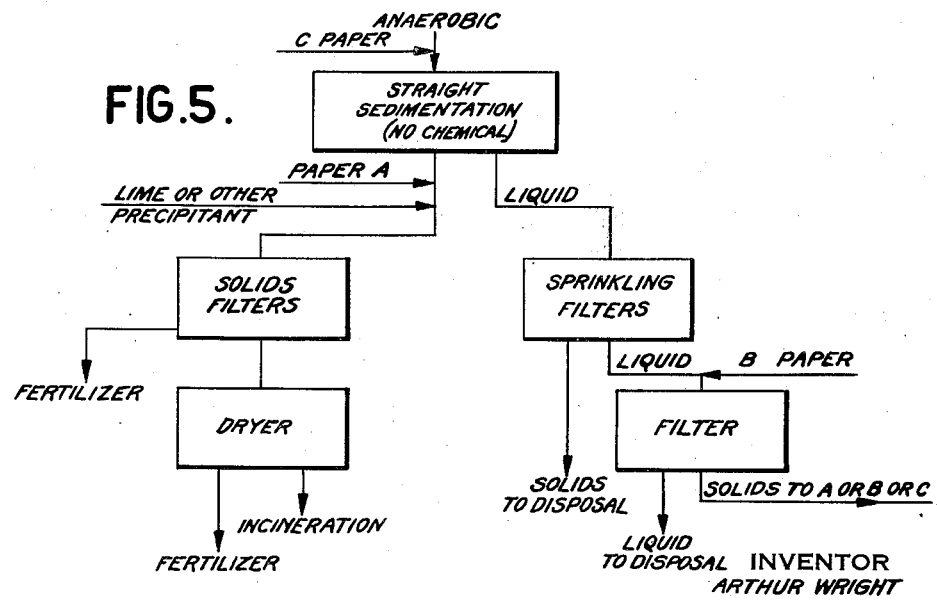

The process of the invention is also applicable to the anaerobic method of waste treatment in which process the settling or sedimentation of the solids takes place without the chemical or bacterial treatment of the wastes prior to the settling. The overflow from the settling passes to sprinkling filters as shown in Figure 5 where a bacterial condition exists for consuming the very fine solids in the liquid. The liquids from the sprinkling filter are mixed with paper and the solids dewatered such as by filtering. The solids from the dewatering station or filter may then be passed to "A" for supplying the paper pulp added to the solids obtained from the settlings. The mixture of settlings and paper are chemically treated and then may be dewatered by filtering and the filtered solids manufactured into fertilizer or the solids may be dried before conversion into fertilizer or may be dried and burned as in the other processes.

The above discussion describes in detail the application of the process to municipal wastes or sewage and industrial wastes such as dye house, and wool scouring wastes may be subjected to the same treatment and the same beneficial results will be obtained. It will not be necessary, therefore, to repeat the description of the process with respect to industrial wastes.

In a few municipalities, one or more industries of the vicinity use large quantities of waste paper and paper pulp in their manufacturing process. This pulp is thrown into the waste mains of the municipality and the liquid or wastes have already sufficient fibrous material so that no further addition of paper pulp is necessary. There are only a very small number of localities where such conditions are known and hence the addition of paper pulp to the wastes of municipalities or industries is required in practically every case in order to derive the benefits of the process set out herein.

Various modifications will occur to those skilled in the art in the configuration, composition and disposition of the various component elements going to make up the invention as a whole, as well as the application thereof to various purposes and no limitation is intended by the phraseology of the foregoing description or illustrations in the accompanying drawings except as indicated in the appended claims.

What is claimed is:—

1. In the treatment of sewage or industrial wastes comprising filtering by continuous vacuum filters, the step of adding and mixing disintegrated, incinerable fibrous material with sewage or industrial wastes at any step in the treatment prior to filtration, whereby such fibrous material is mixed with the material to be filtered in sufficient amounts that the disintegrated incinerable fibrous material enmeshes with and binds the solids during filtration and bonds the filter cake into a self-sustaining sheet capable of substantially complete discharge from the filter in sheet-like form.

2. In the treatment of sewage or industrial wastes the steps of forming an admixture of combustible fibrous organic material and the overflow liquid from the settling of the sewage or industrial wastes in sufficient amounts that the fibrous organic material bonds the wastes during a subsequent step of filtration into a self-sustaining sheet of filter cake capable of substantially complete discharge, continuously filtering the solids from said admixture, continuously discharging said filter cake from the filter in sheet-like form, returning the filter cake to unfiltered overflow liquid and filtering said mixture of filter cake and said overflow liquid.

3. In the treatment of sewage or industrial wastes in which the solids of the wastes are flocculated, the steps of mixing fibrous organic material with the flocculated wastes at any step in its treatment in sufficient amounts that the fibrous organic material enmeshes with and bonds the wastes during a subsequent step of continuous filtration into a self-sustaining sheet of filter cake capable of substantially complete discharge, continuously filtering the admixture upon a continuous vacuum filter and continuously discharging the admixture in sheet-like form.

4. In the cyclic treatment of sewage or industrial wastes, the steps of forming an admixture of combustible fibrous material and the overflow liquid from the settling of the sewage or industrial wastes in sufficient amounts that the fibrous material bonds the wastes during a subsequent step of filtration into a self-sustaining sheet of filter cake capable of substantially complete discharge, filtering the solids from said admixture, discharging said filter cake in sheet-like form, returning some of the filtered solids comprising the combustible fibrous material to unfiltered overflow liquid and passing the remaining solids comprising the combustible fibrous material to the underflow liquid to reenforce and bond the solids thereof in a subsequent step of continuous filtration into a self-sustaining sheet of filter cake capable of substantially complete discharge and adding fresh combustible fibrous material to the overflow liquid.

5. The method of filtering sewage which comprises the addition and mixture of a batch of cellulose pulp with a dilute sewage stream containing substantially only finely divided solids and from which the larger solids have been separated, passing the mixture thus produced to a filter thereby forming a cake of the cellulose pulp and sewage solids on the filter, the continuous removal of the filter cake in sheet-like form, the repeated separation of a predetermined portion thereof and the mixture therewith of fresh cellulose pulp and the return of the admixture of filter cake and fresh pulp and its repulping in the sewage stream before it reaches the filter, that portion of the filter cake not mixed with fresh pulp being evacuated from the system.

ARTHUR WRIGHT.